United States Patent
Breitling et al.

(10) Patent No.: US 7,370,244 B2
(45) Date of Patent: May 6, 2008

(54) USER-GUIDED ERROR CORRECTION

(75) Inventors: Thomas Breitling, Edingen-Neckarhausen (DE); Daniel Bock, Heidelberg (DE); Stefan Walz, Sinzheim (DE)

(73) Assignee: SAP AG, Walldorf (DE)

( * ) Notice: Subject to any disclaimer, the term of this patent is extended or adjusted under 35 U.S.C. 154(b) by 657 days.

(21) Appl. No.: 10/853,167

(22) Filed: May 26, 2004

(65) Prior Publication Data
US 2005/0278587 A1    Dec. 15, 2005

(51) Int. Cl.
*G06F 11/00* (2006.01)

(52) U.S. Cl. .............. 714/49; 705/1; 714/15
(58) Field of Classification Search .......... 714/49
See application file for complete search history.

(56) References Cited

U.S. PATENT DOCUMENTS

| | | | |
|---|---|---|---|
| 4,888,690 A | 12/1989 | Huber | |
| 6,052,525 A | 4/2000 | Carlson et al. | |
| 6,408,407 B1 | 6/2002 | Sadler | |
| 6,587,843 B1 * | 7/2003 | Gelfer et al. | 705/60 |
| 6,636,991 B1 | 10/2003 | Quach | |
| 6,687,846 B1 | 2/2004 | Adrangi et al. | |
| 6,718,230 B2 * | 4/2004 | Nishiyama | 700/231 |
| 6,834,257 B2 | 12/2004 | Keller | |
| 7,036,052 B2 | 4/2006 | Pierce | |
| 7,225,367 B2 * | 5/2007 | Hashem et al. | 714/48 |
| 2002/0161859 A1 * | 10/2002 | Willcox et al. | 709/219 |
| 2003/0033526 A1 * | 2/2003 | French et al. | 713/168 |
| 2003/0093479 A1 * | 5/2003 | Mellen-Garnett et al. | 709/205 |
| 2004/0128240 A1 * | 7/2004 | Yusin | 705/39 |
| 2005/0187874 A1 * | 8/2005 | Sanal | 705/40 |
| 2005/0240600 A1 * | 10/2005 | Hill | 707/100 |
| 2007/0179889 A1 * | 8/2007 | Drummond et al. | 705/43 |

FOREIGN PATENT DOCUMENTS

WO    WO 0108034    2/2001

OTHER PUBLICATIONS

Hansen, J.V., "Audit considerations in distributed processing systems," Computing Practices, ACM vol. 26, No. 8, pp. 562-569, Aug. 1983.

* cited by examiner

*Primary Examiner*—Scott Baderman
*Assistant Examiner*—Paul F Contino
(74) *Attorney, Agent, or Firm*—Fish & Richardson P.C.

(57) ABSTRACT

Techniques for error handling are described for errors detected by a computer application that receives and processes application transaction data generated by a different computer application. A determination is made as to the type of error that has been detected. Based on the determination, error correction guidance is displayed to a user for use in using the computer application that received the application transaction data to correct the error. In response to receiving an indication that the error has been corrected by the user, processing of the application transaction data by the receiving computer application is initiated.

18 Claims, 8 Drawing Sheets

| Sales Order Object | Application Component | Error Message Text | Error Correction Guidance | Error Corrected |
|---|---|---|---|---|
| 500483 | Settlement Rule | Characteristic Business Area could not be derived | + | |
| 500566 | Costing | Cost Center 74711 not valid for period 004/2004 | + | |
| 500576 | Costing | Cost element 401010 is not assigned to a cost component | + | + |
| | Quantity Structure | Itemization item 00001 does not have a cost element | + | + |
| 500636 | Settlement Rule | Attribute Cost Element missing: service process 8954301 | + | + |
| | Costing | Settlement profile A100 does not allow profitability segment | + | |
| 500712 | | Date 00.00.0000 not expected | | |
| 500801 | Internal Order | Function not included | | + |

FIG. 6

# USER-GUIDED ERROR CORRECTION

TECHNICAL FIELD

This description relates to communicating data between application programs in computer systems.

BACKGROUND

Enterprise information technology (IT) systems often are used to manage and process business data. To do so, a business enterprise may use various application programs running on one or more enterprise IT systems. Application programs may be used to process business transactions, such as taking and fulfilling customer orders and providing supply chain and inventory management. Separate application programs working independent of each other may be linked via asynchronous messages that are periodically exchanged. Sometimes a problem occurs in the transfer of data from one application program to another application program. More particularly, sometimes data sent from one application program to another application program is not able to be accepted and/or processed by the receiving application program.

One approach to handling errors in received data is for the receiving system to send the data back to the sending system, often with an indication that an error has been detected by the receiving system. However, a user of the sending system may not be capable of understanding or correcting the error. This may be particularly true when correcting the error requires a change to be made on the receiving system. By way of example, when an enterprise IT system includes a sales system and a financial system, the sales system may send data to the financial system, which is only capable of accepting data that passes particular types of validity checks and other types of data consistency checks. When data received by the financial system does not pass the data consistency checks, an error occurs in the financial system and a message describing the error and/or the received data is returned to the sales system for error handling. However, a user of the sales system may not understand or be capable of correcting the error without access to the financial system. For example, an error may be generated if the financial system is sent data for a time period that has been closed in the financial system. The error could be fixed by reopening the time period in the financial system, which the user of the sales system is not able to do. As another example, an error may be generated if cost center information is incorrect or missing in the financial system, which the user of the sales system cannot fix. In such a case, one approach is to have a user of the sales system call or otherwise communicate with a user of the financial system who is able to fix the financial system conditions from which the error resulted. Then the user of the sales system resends the data to the financial system for processing.

Another approach for handling errors in data received from another system is have a user monitor the receipt of the data. Using the receiving system, the user interactively corrects errors that occur.

SUMMARY

An enterprise information technology (IT) system includes a logistics application and a financial application. In some implementations, the logistics application and financial application optionally communicate through a middleware messaging system. In any case, the logistics application sends the financial application information to be processed. The financial application may detect errors when validating, or otherwise processing, the information from the logistics application. In some cases, the error may be corrected within the financial application, and the error and the associated information from the logistics application are saved for later processing at the financial application. In such a case, an error handling interface is provided that enables a user to correct the errors and initiates the reprocessing of the data. The error handling interface also provides error correction guidance to help the user correct errors. When the error is not able to be corrected within the financial application, the error is sent back to the logistics application for handling. Whether the error is stored on the financial application or sent to the logistics application may be configurable by a user, such as a system administrator.

Storing and correcting the error on the financial application is generally preferred to sending information back to the logistics application because the processing of the information sent by the logistics application to the financial application is not delayed. Storing and correcting the error on the financial application also helps to eliminate re-sending the information to the financial application from the logistics application and to eliminate, or minimize, repeating the processing of the data that occurred prior to the detection of the error when the data first was sent to the financial application.

In one general aspect, error handling includes receiving an indication of an error related to processing application transaction data received by a first computer application and sent from, and generated by, a second computer application. The first computer application and the second computer application are part of an integrated computing process. The error is detected by the first computer application during the processing of the received application transaction data, and the error is of a nature that the processing of the received application transaction data by the first computer application is halted because of the error. A determination is made as to the type of error that is associated with the error. Based on the determined type of error, error correction guidance is displayed to a user for use in using the first computer application to correct the error. In response to receiving an indication that the error has been corrected by the user, the first computer application initiates processing of the application transaction data received by the first computer application.

Implementations may include one or more of the following features. For example, the processing steps successfully performed before detection of the error are not repeated in the processing by the first computer application of the application transaction data that is performed after the receipt of the indication that the error has been corrected.

The error correction guidance may include a display of information about incomplete or missing data related a particular transaction in the application transaction data received from the second computer application that is related to the error, and a control operable for receiving entry of the incomplete or missing data. The error correction guidance also may include a display of information describing the error related to a particular transaction in the application transaction data received from the second computer, a particular transaction in the application transaction data received from the second computer application that is related to the error, and a control operable to initiate a function in the first computer application that may be used to correct the error. The error correction guidance further may include a user interface for performing a sequence of multiple steps in an error correction process in which the user interface includes, for each step, 1) a display of information describing associated with the step, 2) a control for progressing to a next step in the sequence of multiple steps, and 3) a control operable for receiving entry of data related to the step.

A user may be able to associate a type of error with particular error correction guidance to be used to correct the type of error. If so, particular error correction guidance may be displayed based on 1) a determination as to the type of error that is associated with the error and 2) an association of the type of error and particular error correction guidance.

An indication of a second error may be received in which the second error is related to processing application transaction data received by a first computer application and sent from, and generated by, a second computer application, as part of an integrated computing process. The second error may be associated with a second application transaction received from the second computer application and may be of the same type of error that is associated with the first error. In response to receiving an indication that the first error has been corrected by the user, processing by the first computer application of the second application transaction data may be initiated.

The first computing application may be a financial application and the second computing application may be a logistics application. The first computing application may operate on a first computing system, the second computing application may operate on a second computing system, and the application transaction data may be communicated between the first computing system and the second computing system.

Implementations of the techniques discussed above may include a method or process, a system or apparatus, or computer software on a computer-accessible medium. The details of one or more of the implementations are set forth in the accompanying drawings and description below. Other features will be apparent from the description and drawings, and from the claims.

DESCRIPTION OF DRAWINGS

FIGS. 6-8 are illustrations of user interfaces for correcting errors that occur within the enterprise IT system of FIG. 1 or FIG. 2.

DETAILED DESCRIPTION

Figure 1:
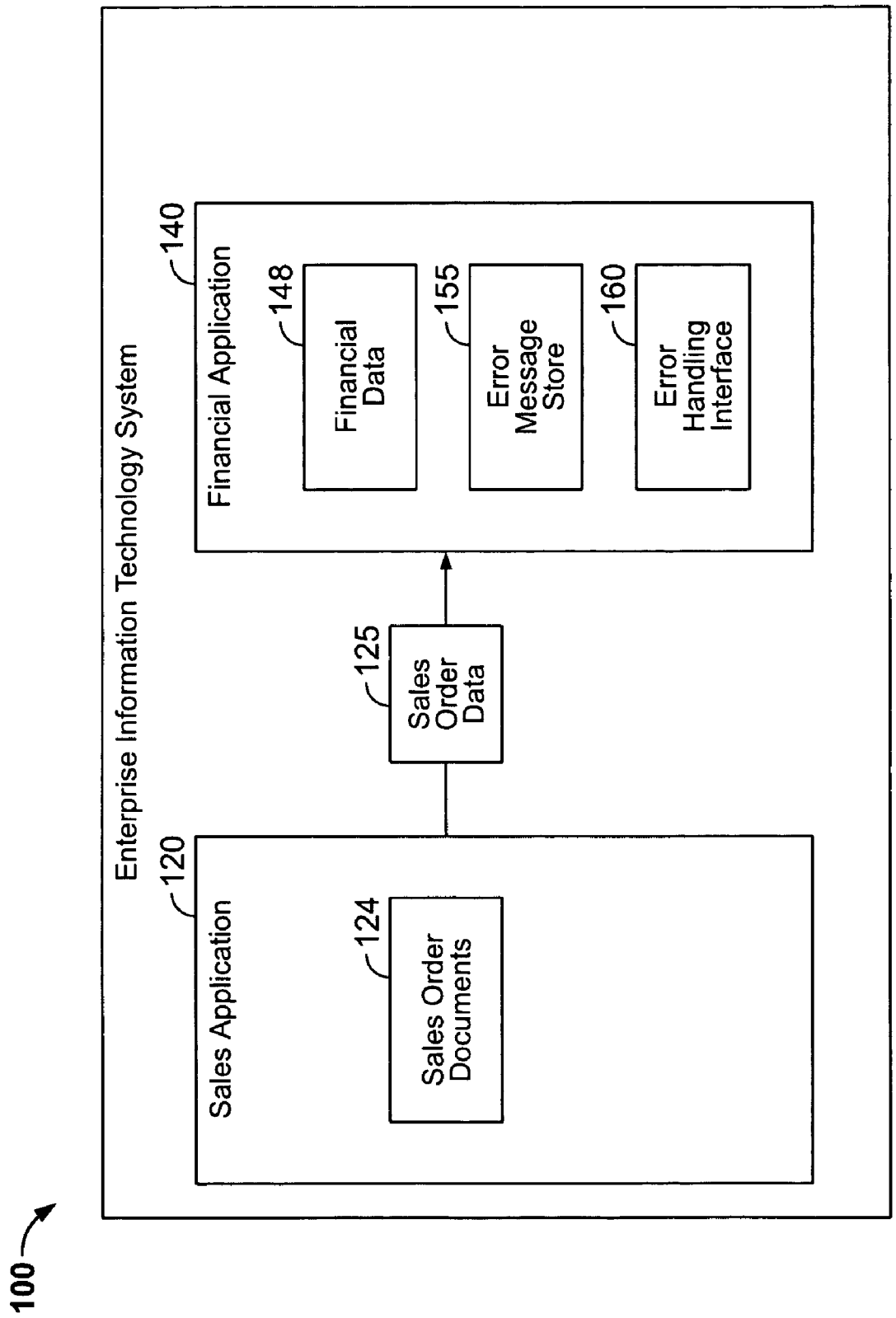
FIGS. 1 and 2 are block diagrams of enterprise IT systems in which errors are detected by receiving application in data sent by a sending application and the detected errors are handled at the receiving application.

An enterprise information technology (IT) system 100, shown in FIG. 1, handles errors detected when sending data from a sales application 120 to a financial application 140 in accordance with the invention. In general, sales order data 125, or other types of information, from the sales application 120 is transferred to the financial application 140. When the financial application 140 receives the sales order data 125, the financial application 140 checks the sales order data 125 for errors. The financial application may detect errors when validating, or otherwise processing, the information from the sales application. When the error may be corrected within the financial application, the error and information associated with the error are stored for later correction processing at the financial application. An error handling interface is provided that enables a user to correct the errors and initiates the re-processing of the data. When the error is not able to be corrected within the financial application, the error is sent back to the sales application for handling.

More particularly, the sales application 120 may be used by a sales person or other type of user to create and revise sales order documents 124 (or sales order data). The sales order documents 124 are an example of application transaction data. The sales application 120 may be, for example, a call center software application in which a sales agent enters sales order while talking to a customer on a telephone. Another example of a sales application 120 is a customer relationship management (CRM) application. The sales application 120 provides, to the financial application 140, sales order data 125 which represents all of, or portions of, sales order documents 124.

The financial application 140 processes the received sales order data 125 to generate and store financial data 148 related to the received sales order data 125. In one example, the financial application 140 may process the sales order data 125 to generate income, cost and profitability financial data. The financial application 140 also may process the received sales order data 125 to transform the received data into a form suitable for use by the financial application 140 and store the data as part of the financial data 148 of the financial application 140. Also, the financial application 140 may be used to fulfill and execute the sales orders placed using the sales application 120. In such a case, the financial application 140 may be, for example, a software application used by an order fulfillment center.

The sales application 120 and the financial application 140 may be logically decoupled and/or physically decoupled. Logical decoupling refers to the fact that knowledge needed to use the sales application 120 and the financial application 140 is related to different topics, so it is likely that a user of the sales application 120 does not have the ability to use the financial application 140 to correct errors detected in the financial application, and vice versa. Physical decoupling means that the sales application 120 and the financial application 140 are physically separated. Thus, when physically decoupled, each of the sales application 120 and the financial application 140 may be located on separate computer systems, including computer systems that are in distinct locations. When the sales application 120 and the financial application 140 are physically decoupled, some means for communication between the computer system on which the sales application 120 resides and the computer system on which the financial application 140 resides is necessary. Communication may be provided, for example, through a variety of established networks, such as, for example, the Internet, a Public Switched Telephone Network (PSTN), the Worldwide Web (WWW), a wide-area network ("WAN"), a local area network ("LAN"), a wired network, or a wireless network. The communication also may be provided through the use of a middleware messaging system, as described more fully in FIG. 2. In some cases, when the sales application 120 and the financial application 140 are physically decoupled, a user of the sales application 140 may not be able to physically access the financial application 140, and vice versa. When the financial application 140 is physically decoupled from the sales application 120, the applications 120 and 140 may be logically decoupled as well, though not necessarily so.

The financial application 140 may detect, during or before the processing of some, or all of, the data received from by the sales application 120, unintended states in the data received from the sales application 120 that prevent the data from being correctly processed, or perhaps, even stored by the financial application 140. The unintended states may be referred to as errors. More particularly, an error may prevent further processing of the sales order data 125, or a portion thereof, due to wrong or incomplete data being sent from the sales application 120. In one example, a sales order may not be able to be processed because the sales order data 125 does not contain all data required for processing by the financial application 140. Another example of a type of error that may be detected by the financial application 140 occurs when a data environment condition in the financial application 140 prevents the sent data from being processed by the financial application 140. One example of this type of error occurs when a sales order references, or otherwise is applicable to, a cost center that is locked or otherwise not available in the financial application 140 when the sales order data is processed by the financial application 140. Similarly, the sales order data 125 may include sales orders for a sales period that is closed, locked or otherwise not available for the entry, or modification, of data in the financial application 145.

Whatever the cause of the error, the detected errors may inhibit the processing of the data, and some types of errors may need to be corrected before the processing of the data may occur or continue in the financial application 140. In some case, errors may need to be corrected before the processed sales order data can be stored as part of financial data 148 in the financial application 140. Correcting errors by taking appropriate measures to repair the data and/or to remove the cause of the error may be referred to as error handling.

The financial application 140 includes an error message store 155 for storing errors detected in received sales order data or when processing the received data. The error message store 155 also may store information related to the detected errors to help in the correction of the errors or in re-processing the data once the errors have been corrected. One example of information that may be stored is the storage of a sales order document related to the error. Another example of information that may be stored includes application data produced by the financial system when processing the sales order data received from the sales application 120. The error message store 155 also may include, for an error, an indication of the type of error and an identification of the sales order document related to an error. The error messages are stored when the corresponding error occurs when the financial application 140 determines that the corresponding error may be corrected with the error handing user interface on the financial application 140. The storage of errors in the financial application 140 may enable the handling of errors, prior to the received data being stored with the financial data, through use of an error handling interface 160 included in the financial application 140.

The error messages included in the error message store 155 may be categorized in a variety of ways. For example, an error message may categorized based on the type of data that was being checked or processed when the error was detected, the time at which the error occurred, or by the operation or function (which may be referred to collectively as an application component) that was being executed when the error was detected.

A user accesses the error handling user interface 160 to correct errors stored in the error message store 155, so that the received sales order data 125 may be accepted, processed and stored as financial data 148 in the financial application 140. The error handling interface 160 displays and enables the correction of the errors identified by the financial application 140 and stored within the error message store 155. After the error has been corrected, then processing of the sales order data 125 by the financial application may continue from the point at which the error occurred. In some cases, such as when an error occurs in the last step of a process being performed by the financial application 140 on the sales order data 125, there may not be a need to restart processing at the point at which the process was interrupted by the error. The error handling interface 160 also may provide error correction guidance to help a user correct an error or errors, as described more fully later. Often, a user may use the financial application to correct errors. In some implementations, some of the errors may be corrected programmatically without the need for a user to use the financial application to correct the errors. This may be particularly true when a user has corrected a data environmental condition that applies to more than one sales order.

When an error in received sales order data 125 is not able to be corrected by a user of the financial application 140, then an error message describing the error and, optionally, including the sales order data 125, or portion thereof, to which the error is applicable are sent back to the sales application 120 in a manner analogous to how the data was sent to the financial application 140 for processing. In some implementations, a different type of mechanism for returning the data may be used to return error messages and optional sales order data to the sales application 120 than the mechanism used for sending the sales data 145 to the financial application 140. This may be particularly useful in a enterprise IT system 100 in which the sales application 120 is physically decoupled from the financial application 140. In some implementations, the error message store 155 and the error handling interface 160 are included as part of a separate error handling application program on the enterprise IT system 100.

Figure 2:
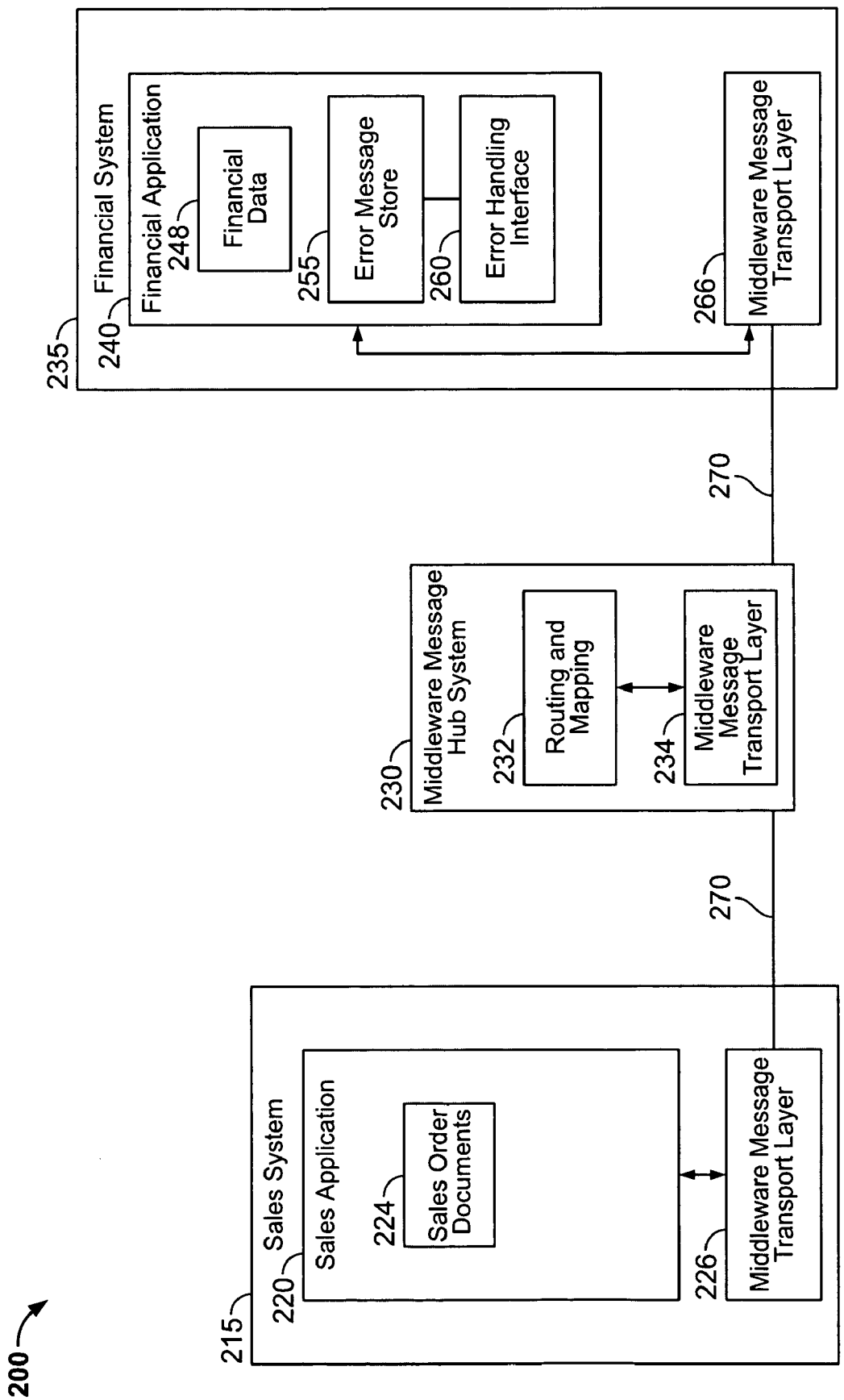

An enterprise IT system 200, shown in FIG. 2, is an example of a sales system 215 that is both logically decoupled and physically decoupled from a financial system 235. The sales system 215 and the financial system 235 communicate through the use of a middleware message hub system 230. For brevity, the structure and arrangement of FIG. 2 is based on the structure and arrangement of FIG. 1. As would be recognized by one skilled in the art, however, the components and processes of FIG. 2 need not be the same as those described with respect to FIG. 1, nor are the techniques described with respect to FIG. 2 limited to being performed by the structure and arrangement illustrated by FIG. 2. Messages containing enterprise application data are transferred asynchronously from the sales system 215 and eventually to the financial system 235, either directly or by way of the middleware message hub system 230 as is depicted in FIG. 2. The messages are exchanged using a messaging system (that is, middleware) using store-and-forward message transfer. When the financial system 235 receives a message, the financial application 240 on the financial system 235 checks the data transferred in the message for errors and processes detected errors in accordance with the invention.

The sales system 215 and the financial system 235 may be connected to the middleware messaging system through communications links 270. The communications links 270 may include the Internet, the World Wide Web, wide area networks (WANs), local area networks (LANs), analog or digital wired and wireless telephone networks (e.g., the public switched telephone network (PSTN), an integrated services digital network (ISDN), or a digital subscriber line (DSL)), radio, television, cable, satellite, and/or any other delivery mechanism for carrying data. The sales system 215, the financial system 235, and the middleware message hub system 230 may be connected to the communications links 270 through communications pathways (not shown) that enable communications through the communications link 270 described above. Each of the communication pathways may include, for example, a wired, wireless, cable or satellite communication pathway.

The sales system 215 includes a sales application 220, in which sales order documents 224 (or sales order objects) are created and revised. The sales system 215 may be, for example, a computer system having a sales application thereon which is used by a salesperson. As such, the sales system 215 may be a mobile computing system such as a laptop computer or a personal digital assistant (PDA). The sales system 215 may also be, for example, a computer system with a call center software application thereon, in which a sales agent enters sales order while talking to a customer on a telephone. Another example of a sales system 215 is an Internet shop to which a user may connect, for example via the Internet, and enter a sales order via a web interface. The sales system 215 may also have the capability to derive from a sales order document 224 information that is needed for delivery and package that information into a delivery request message, as will be described in more detail later. In one implementation, the sales system 215 is a customer relationship management system.

The sales system 215 also includes a middleware message transport layer 226, which is part of the previously mentioned messaging system, or middleware, for the enterprise IT system 200. Information, such as one of the sales order documents 224, or alternatively data derived from a sales order document such as delivery information, that needs to be forwarded to another system, such as the financial system 235, first gets forwarded, or "posted," by the sales application 220 to the message transport layer 226. This is illustrated in FIG. 2 by the arrows shown from the sales application 220 to the middleware message transport layer 226. The information is forwarded in a message, and, in the case when a sales order document is forwarded, the information included in the message may be the sales order document itself, may be another document including only selected data from the sales order document, or may be yet another document derived from, or calculated from, information in the sales order document. For example, the message may contain the previously mentioned delivery request information that is pulled from, or derived from, the sales order document where the delivery request information includes only the information needed by the financial system 235 to effect delivery of the purchased item. As an example of information included in a message that is derived from the sales order document, suppose the sales application 220 holds a sales order document with n line items. In that case a message could contain an aggregated view of the sales order with a sum of prices over all line items, instead of all line items individually. As such, the derived information (or document) and the object (or document) from which the derived document is based may look similar but they need not be identical. Whatever the case may be, the information contained in the message will be referred to herein as a document.

The middleware message transport layer 226 controls the forwarding of messages from the sales system 215 for eventual receipt by the financial system 235. In the FIG. 2 example, it is shown that the messages are forwarded first to the middleware message hub system 230 en route to the financial system 235. This is just an example of how a message may be routed to another system. Alternatively, messages may be transferred directly between systems 215 and 235.

The middleware message hub system 230 serves as a central messaging center for the entire enterprise IT system 200. In many cases it is desirable to utilize such a message hub system 230. For example, a system within the enterprise IT system 200 may send messages to several other systems. Instead of having a direct connection to each system to which the system transfers messages, the system need only be interconnected with the middleware message hub system 230. Then from the middleware message hub system 230, the message may be forwarded to its eventual destination. It will be appreciated that in FIG. 2, for simplicity, only two systems 215 and 235 and associated software applications 220 and 240 are shown, but in an actual enterprise IT system, there may be many more systems and applications, and each system may communicate with multiple other systems within the overall enterprise IT system.

The middleware message hub system 230 includes a routing and mapping software application 232 and a middleware message transport layer 234. The routing and mapping software application 232 performs two main functions. First, the application 232 determines where a received message is to be forwarded, or routed, to reach its ultimate destination. Second, the application 232 performs a mapping function, if necessary. For example, if the data format used by the financial system 235 (or financial application 240) from that used by the sales system 215 (or sales application 220), then the application 232 may translate the format for a received message into a format that can be understood by the financial system 235.

The middleware message hub system's message transport layer 234 is part of the previously mentioned messaging system, or middleware, for the enterprise IT system 200, and is similar in function to the message transport layer 226 in the sales system 215. The message transport layer 234 controls the forwarding of messages from the middleware message hub system 230 for eventual receipt by the financial system 235. In the FIG. 2 example, it is shown that the messages are forwarded from the middleware message hub system 230 directly to the financial system 235.

The financial system 235 includes a financial application 240, in which financial data related to sales order documents 224 (or sales order objects) and financial data related to other types of enterprise application data is generated based on data received from the sales application 220 or other types of applications. The financial application includes financial data 248, an error message store 255, and an error handling interface 260.

The financial system 235 also includes a middleware message transport layer 266, which is part of the previously mentioned messaging system, or middleware, for the enterprise IT system 200. The message transport layer 266 is similar in function to the message transport layers 226 and 234 in the sales system 215 and in the middleware message hub system 230 for eventual processing by the financial application 240. The middleware message transport layers 226 and 266 are connected to the middleware message hub system 230 through communications links 70.

The financial application 240 receives, through the middleware message hub system 230, data from the sales application 220. As described previously, the financial application 240 begins processing the received data and detects the occurrence of an unexpected interruption of processing that is due to a detected error. When the error can be fixed at the financial application 240, the financial application stores information related to the error in the error message store 255 for use in correcting the error without sending the data back to the sales system 215 for correction. A user of the financial application uses the error handling interface 260 to perform error correction procedures for one or more errors. The error handling interface 260 also may restart processing, by the financial application 240, of data related to the corrected error at the point of interruption when the error was detected.

Figure 3:
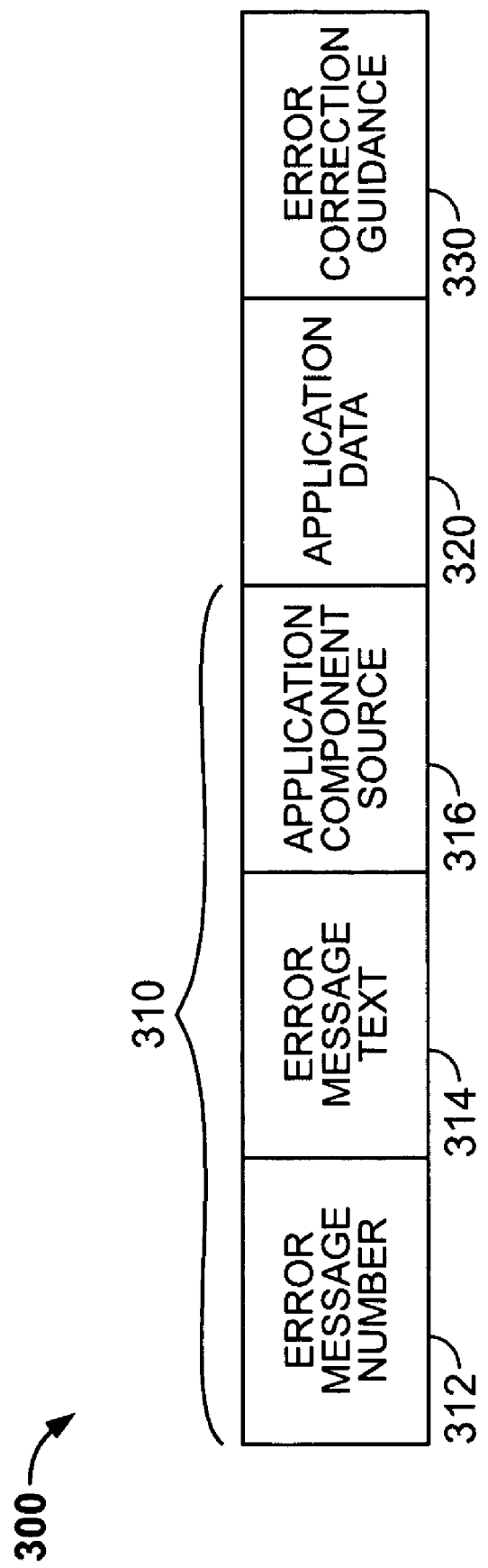
FIG. 3 is a diagram illustrating a data structure for providing error information.

Before discussing the additional detail regarding the method by which errors are handled within the enterprise IT systems described in FIG. 1 or 2, it is first helpful to describe an example format that may be used for storing error information for errors detected by the financial application. Referring to FIG. 3, an example data structure 300 is shown, in simplified form, for storing information related to each detected errors. In FIG. 3, the data structure 300 for error information may be, for example, an implementation of a data structure used by error message store 155 in FIG. 1 or 255 in FIG. 2 to store errors detected by the financial application. The data structure 300 includes, for each entry of error information stored, error message information 310 having an error message number 312 that uniquely identifies a particular type of error message, error message text 314 that describes the type of error that has occurred, and an application component source 316 that identifies the application component of the financial application that generated the error. In some implementations, the error message text 314 and an association of the error message text with an error message number may be stored in a data structure or structures that are separate from the error information data structure 300. In such a case, the error message text may be accessed for display along with, or in lieu of, the error message number. This may be accomplished, for example, by using a database table to store error message text for each error message number and looking up the error message number in the database table to identify and display the error message text associated with the error message number.

The data structure 300 also may include application data 320 associated with the detected error. The application data 320 may include all of, or a portion of, the received data (such as sales data) that generated the error. Additionally or alternatively, the application data 320 may include financial data created by the financial application during the processing of the received data. The application data 320 also may include other types of data (such as status information or an identification of the point at which processing was interrupted) that may be used by the financial application when processing of the received data continues at the point at which processing was interrupted.

The data structure 300 also may include error correction guidance 330 that describes how the type of error may be corrected or otherwise addressed. The error correction guidance 330 may be provided in different forms or modes. The type of error correction guidance 330 that is stored may be based on the type of error correction guidance provided. In one example, error correction guidance may be a static display of information that describes how a user is able to correct the error. In such a case, the error correction guidance 300 may indicate the information to be displayed or may indicate a document or other type of data storage method or location by which the information to be displayed may be accessed. In another example, the error correction guidance may be a static display of information that describes how to correct the error and a user interface control (such as a button or a link) that can be activated by a user to initiate a function, module, method, script or other type of programming code or software for correcting the error or starting the first step in a multiple step process to correct the error. When so, the error correction guidance 330 may indicate both the information (or where to access the information) and the control to be displayed. In yet another example, the error correction guidance may be an interactive dialog with the user to guide the user in correcting the error. In such a case, the error correction guidance 330 may identify how to initiate the dialog (such as by including a link to activate the dialog or a name of a programming function that may be called to activate the dialog). In addition, the error correction guidance 330 may indicate whether the financial application should automatically restart the process at the point of interruption once the error correction guidance has been executed or an indication has otherwise been received (such as directly from a user) that the error has been corrected. If so, in some implementations, the error correction guidance 340 also may identify the point at which the financial application should be re-started. As with the error message text, the error correction guidance may be stored in a separate data structure or structures in association with the error message number to which the error correction guidance applies.

In some implementations, the data structure 300 also may include an error identifier that uniquely identifies each error in the data structure 300. This may be particularly useful when the same type of error (such as, an error that has the same error message number as another error) may be generated multiple times for different portions of received data. For example, many sales order may be received that all refer to a closed sales period or a cost center that does not exist in the financial application. In such a case, each sales order would be associated with errors related to the closed sales period and errors related to the invalid cost center. In some implementations, the data structure 300 also may include a data source identifier that identifies the sending system or sending application from which the received data originated. This may be particularly useful when data may be received by the financial application from different types of applications (such as a mobile sales application and a call center sales application).

Figure 4:
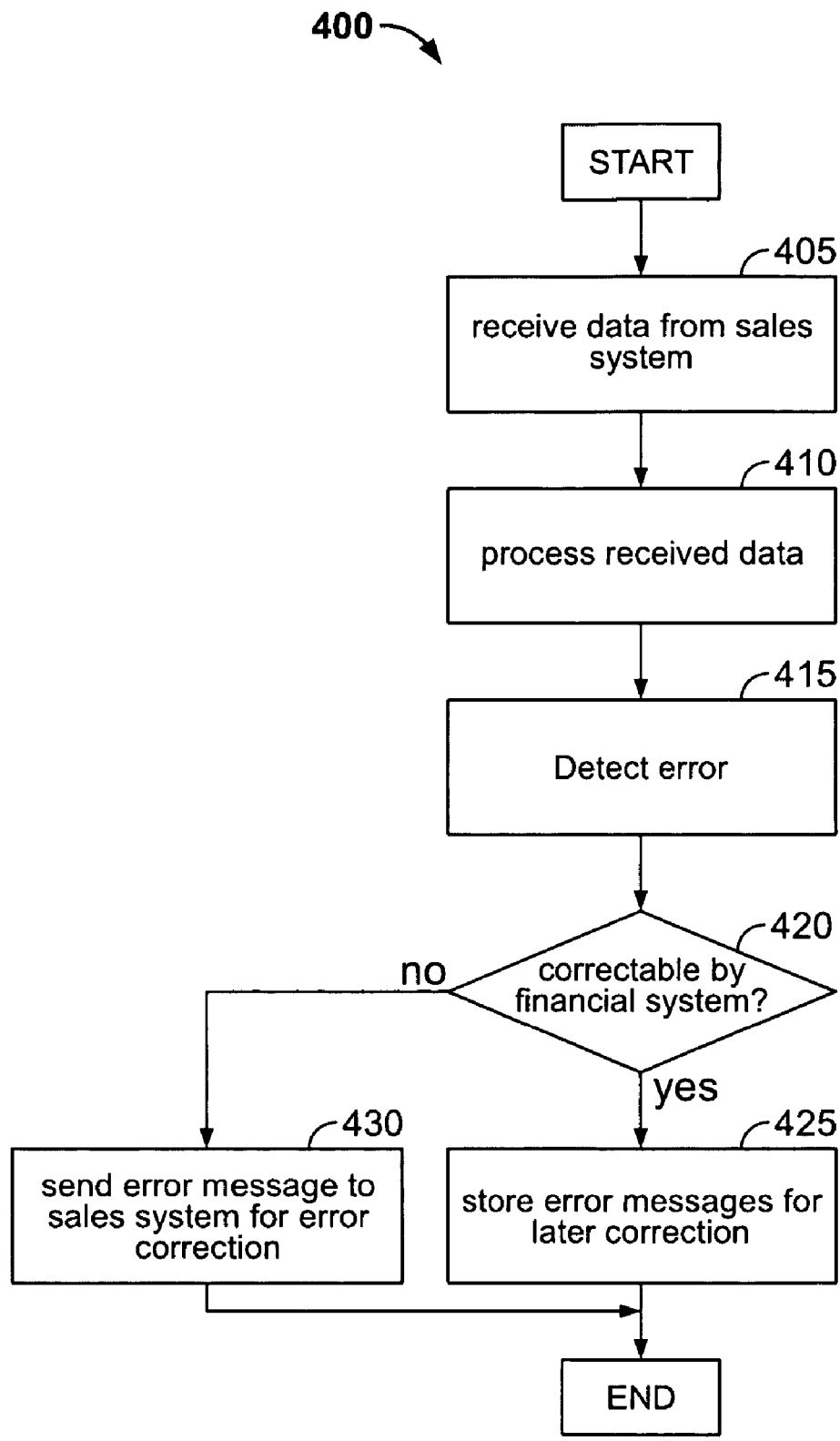
FIG. 4 is a flow chart of a process for detecting and handling errors within the enterprise IT system of FIG. 1 or FIG. 2.

FIG. 4 is a flow chart of a process 400 for detecting and handling errors within the enterprise IT system 100 of FIG. 1 or 200 of FIG. 2. The process 400 is executed by a receiving system in an enterprise IT system, for example, by the financial application 140 of FIG. 1 or 240 of FIG. 2, to detect and handle errors in data received from a sending application, such as, for example, sales application 120 of FIG. 1 or 220 of FIG. 2. The processor executing the process 400 generates error messages describing the detected errors. The error messages and enterprise application data associated with the error messages may be stored by the financial application for error correction, or, alternatively, sent back to the sales application for error correction.

The process 400 begins when the financial application receives data from the sales application for processing (step 405) and begins processing the data received from the sales application (step 410). Processing the data generally includes validating the data to ensure that complete and correct data that is able to be processed by the financial application has been received.

When the financial application determines that an error has occurred related to the received data (step 415), a determination is made as to whether the error may be corrected by the financial application (step 420). This may be accomplished, for example, by accessing a table, list or other type of information that identifies the types of errors that are able to be corrected in the financial application and the types of errors that need to be sent back to the sales system for correction. In some implementations, a user (such as a system administrator) of the financial application may specify the types of errors that may be corrected by the financial application and those that need to be sent back to the sales application.

When the error may be corrected by the financial application (step 420), then error messages describing the error are stored for later correction (step 425). More particularly, the error messages may be stored in an error message store, such as the error message store 155 of FIG. 1 or 255 of FIG. 2, that is separate from the financial data, such as financial data 148 of FIG. 1 or 248 of FIG. 2. After the error messages have been stored in the error message store, a user of a corresponding error handling user interface, such as the error handling user interface 160 of FIG. 1 or 260 of FIG. 2, may access the stored error messages from the error message store and correct the corresponding error based on the stored error messages. One example of such a process is described later in FIG. 5. After the error message is stored for later correction (step 425), the process 400 ends.

When a determination is made that the error is not able to be corrected at the financial application (step 420), then the error messages describing the error and/or the associated enterprise application data is sent back to the sales application, thereby interrupting the flow of information around the enterprise IT system. The process 400 ends.

Figure 5:
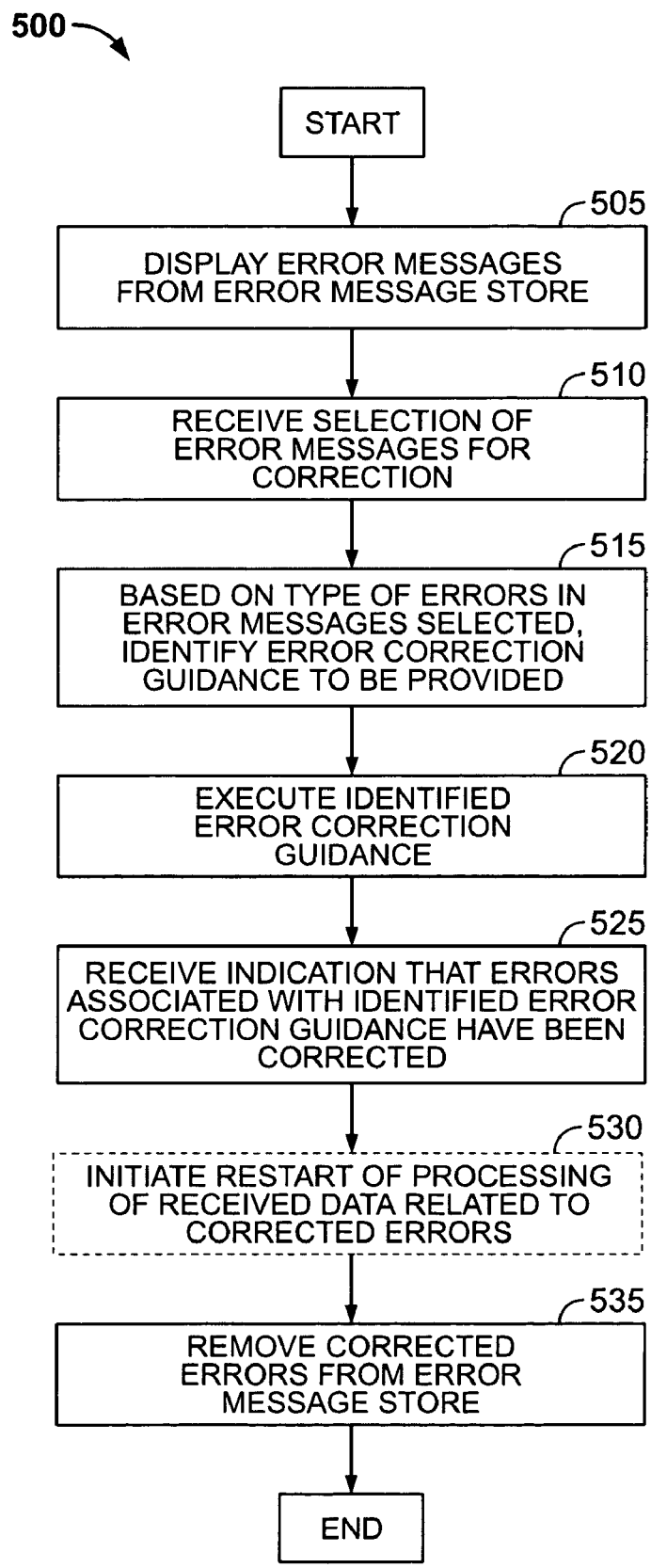
FIG. 5 is a flow chart of a process for enabling user correction of errors that occur within the enterprise IT system of FIG. 1 or FIG. 2.

FIG. 5 illustrates a process 500 for enabling user correction of errors that are detected by the financial application 140 in FIG. 1 or 240 in FIG. 2. An error handling user interface, such as the error handing interface 160 of FIG. 1 or 260 of FIG. 2, executes the process 500 to allow a user of the error handing user interface to correct errors detected while validating or processing data sent to the financial application by the sales application and stored in an error message store.

The process 500 begins when a user of the financial application initiates the error correction process of the error handling interface. In response, the error handling interface displays error messages from the error message store (step 505). In one example, a list of error messages associated with the user are displayed. In another example, the user identifies search criteria to identify error messages for display. For example, the user may wish to display error messages based on a type of data being processed when an error was detected, a range of the dates at which errors were detected, or one or more application components that were being executed when the errors were detected.

The user selects one or more of the displayed error messages for correction with the error handling interface, and the error handling interface receives the selection of error messages to be corrected (step 510). Based on the types of errors identified in the error messages selected by the user, the error handling interface identifies error correction guidance for correcting the error or errors (step 515). This may be accomplished by using the data structure 300 to identify error correction guidance associated with the error. Alternatively, an error message type (that may be represented, in some implementations, as an error message number) may be used to search a data source that identifies the error correction guidance available for various error message types.

The error handling interface then executes the identified error correction guidance to help the user in correcting the error or errors associated with the selected error messages (step 520). The error correction guidance that is executed may take various forms, as described previously in FIG. 3. In one example, executing the error correction guidance may include the execution of a dialog for interactively guiding the user through multiple steps to correct the error or errors. In some implementations, the use of an interactive user interface may be referred to as a dialog, and the user interface itself may be referred to as a wizard. The user interface, in general, presents a series of steps and directions for performing each step to accomplish some type of error correction. For example, the user interface for correcting one type of error may display, for each step, text describing the step, appropriate user interface controls (such as, next step, previous step, or cancel error correction process), and data entry options to specify data related to the error correction step. The user then may progress from one step to another step until the error correction process is completed for the type of error or errors selected by the user. In another example, error correction guidance for the type of error may be presented that describes an action to be taken by the user and, optionally, may present a control that the user may select to perform the action. Similarly, error correction guidance may present a static display of information that describes how to correct the error and a control for starting the first step in a multiple step error correction process.

In another example of error correction guidance, a display of information about incomplete or missing data related to the portion of the received enterprise application data may be presented along with a control operable for receiving entry of the incomplete or missing data. For example, when a sales order object needs to have a cost center identified for the sales order object, the error handling interface may identify that cost center information for the sales order object is missing and present a list of cost centers from which the user is able to select.

In yet another example, error correction guidance may include information describing the detected error related to the portion of the received enterprise application data, the portion of the received enterprise application data related to the detected error, and a control operable to initiate a function in the financial application that may be used to correct the detected error. For example, when a sales period opened on the financial system, a display may identify the particular sales period, query whether the user wants to perform that action, proceed to open the particular sales period after receiving confirmation from the user, and restart the processing of all received sales data that relate to the newly opened sales period. In some implementations, the error handling interface also may query whether the user wants to leave the sales period open or close the sales period after processing the received sales data and leave the cost center open or not based on the user's response.

In another example of error correction guidance, the error handling interface may identify that an invalid cost center— that is, a cost center that is not able to be associated with new data entries or is otherwise invalid—is responsible for multiple of the displayed error messages and lead the user through a dialog where in the user is able to either enhance the validity of the cost center (that is, create or open a cost center) or replace the cost center referenced in the sales order received by the financial application with a valid cost center.

When a user enhances the validity of the cost center, in some implementations, the dialog also may indicate that other errors may be corrected and received confirmation that automated error correction for those other errors should proceed. For example, the number of errors that can be corrected or an identification of sales order objects that also may be so corrected may be displayed.

Once the error correction guidance has been executed, the error handling interface receives an indication that the errors associated with the identified error correction guidance have been performed. The indication may be performed, for example, as a status as to whether the error has been corrected. When the error correction guidance has completed execution, the status indicator may be set to reflect that the error has been corrected. Alternatively, when a user corrects the error by executing a particular function independently of the error correction guidance or, at the suggestion of error correction guidance (such as when the error correction guidance is a static display of how to correct the error), a user may set the status of error correction to indicate that the error has been corrected.

Optionally, the error handling interface may initiate restarting the processing of the received data related to the corrected errors (step 530). This may be accomplished, for example, based on an indication that the data may be re-processed is stored in association with the error correction guidance, as described in FIG. 3. Alternatively or additionally, a user may initiate the re-processing (such as by activating a control to do so) or confirm that the error handling interface should initiate re-processing in response to a prompt or alert presented by the error handling interface.

In some instances, the re-processing of the data related to the corrected errors also may include automated error correction of additional errors where the automatic error correction is performed without requiring human intervention or only requiring minimal human intervention. Examples of minimal human intervention include, but are not limited to, having a user provide confirmation that the automatic error correction process should proceed or having a user initiate the start of the automatic error correction process. For example, after a sales period has been opened to correct an error generated for one sales order that referenced a previously closed or invalid sales period, other sales order having the same error may be automatically reprocessed.

In some implementations, particularly when a environmental condition on the financial application has been modified to correct an error (such as when a sales period has been opened or a cost center added), the re-processing by the error handling interface also may include action to restore the environmental condition of the financial application to the state that existed prior to the error correction process being performed. For example, when an invalid cost center is made valid to correct an error or errors, the cost center may be locked, closed or otherwise made invalid after the errors have been corrected. In some implementations, the error handling user interface closes the cost center only after receiving user instruction or confirmation.

The error handling interface removes the corrected errors from the error message store (step 535). This may be accomplished, for example, as part of the process 500 being performed for a particular error. Alternatively or additionally, the error handling interface may remove corrected errors from the error message store periodically after multiple errors have been corrected. Removing corrected errors also may be accomplished, for example, as an batch process that is performed on a nightly, weekly, or another periodic basis. To do so, the error handling interface identifies errors that have been corrected, such as by identifying errors that have an associated error correction status indicating that the error has been corrected and deletes those errors from the error message store. In some implementations, the deletion is a logical deletion that generally makes the error inaccessible in the error message store. Alternatively or additionally, the deletion may be a physical deletion in which the error is physically removed from the error message store.

In some implementations, the error handling interface may be used to manually send errors and/or associated data back to the sales application for correction. The user may make the determination as to whether to send an error back to the sales application based on the error message, sales data, financial data, and/or guidance provided by the error handling interface. The ability for a user to use the error handling interface to send back an error to the sales application may be useful even when the financial application has the capability to determine whether to send an error to the sales application for correction, as described previously.

In some implementations, the cause of an error may not be able to be determined. In such a case, an unknown error or a general error message may be generated by the financial application, stored in the error message store and displayed using the error handling interface. In such a case, however, the error handling interface may not be able to provide error correction guidance (although in some implementations some guidance as to how a user may go about diagnosing the cause of the error may be able to be provided). After manually correcting the unknown or general error, the user may use the error handling interface to note that the error has been corrected and/or remove the error message from the error message store. In some implementations, the user may be able to initiate re-processing of the data after the unknown or general error has been corrected, such as by activating the error correction guidance control for the unknown or general error message. In one example, an error message may occur during a cost calculation for which the financial application is not able to determine the cause of the error. The error message stored in the error store may indicate a general error message number and associated text (such as, for example, "internal error" or "Date 00.00.0000 not expected"). After analyzing and correcting the error, the user may be able to rerun the cost calculation by pressing the error correction guidance activation control associated with the general error message for the error. In this way, the cost calculation can be re-processed and the result saved in the financial data for the financial application.

Similarly, in some situations, a user may prefer to manually correct the error without using the error correction guidance provided by the error handling interface. In that situation, the user may use the error handling interface to note that the error has been corrected and/or remove the error message from the error message store. As would be understood by one skilled in the art, referring to user manually correcting an error is intended to distinguish a user performing error correction the use of the error correction guidance. Thus, a manual correction includes the use of financial application by a user to correct the error.

FIG. 6 is an illustration of an error handling display 600 that displays information related to an error handling interface, such as may be used by the process 500 in FIG. 5. The error handling display 600 includes multiple headings 610, each of the which corresponds to a particular type of information 612-616 presented for each of the errors 620*a*-

620*i* that are displayed. In some implementations, the order in which the errors 620*a*-620*i* are displayed may be sorted according to a type of information indicated by the headings 612-616 by selecting one of the appropriate headings 612-616.

More particularly with regard to the information displayed, the error handling display 600 includes a sales order object identifier 612 that identifies the sales order object to which each of the errors 620*a*-620*i* applies. The error handling display 600 also includes an application name component name 613 that indicates one of the various components of the financial application in which each of the errors 620*a*-620*i* occurred.

Error message text describing each of the errors 620*a*-620*i* is listed under the error message text heading 614. The error handling display 600 also includes an error correction guidance heading 615 that presents a control for activating a guided error correction process that is available for each of the errors 620*a*-620*h*. In the illustrated example, the presence of a graphical icon under the guided interaction heading 625 in the error list display 600 indicates that the corresponding error 620*a*-620*h* is associated with error correction guidance, while the absence of a graphical icon indicates that the corresponding error (here, error 620*i*) needs to be corrected by the user without benefit of error correction guidance. (The correction by the user of an error without benefit of error correction guidance may be referred to as manual correction.) In some implementations, the error handing display 600 may also includes an identifier heading under which unique identifiers of the errors 620*a*-620*i* are listed. When the user activates the error correction guidance icon for an error, error correction guidance is initiated for the error, as described previously with respect to FIGS. 3 and 5.

The error corrected heading 616 indicates whether each of the errors 620*a*-620 has been corrected. The presence of an icon under heading 616 indicates that the corresponding error has been corrected, as illustrated by errors 620*c*-620*e* and 620*i*. In contrast, the absence of an icon indicates that the corresponding error has not yet been corrected as illustrated by errors 620*a*-*b* and 620*f*-620*h*. As described previously, the error corrected information for each error may be presented based on the status of whether the error has been corrected or not. The correction status of an error may be set by the error handing interface when the interface is used to correct the error. Additionally or alternatively, the correction status of the error may be set by a user through the error handling interface.

Figure 7:
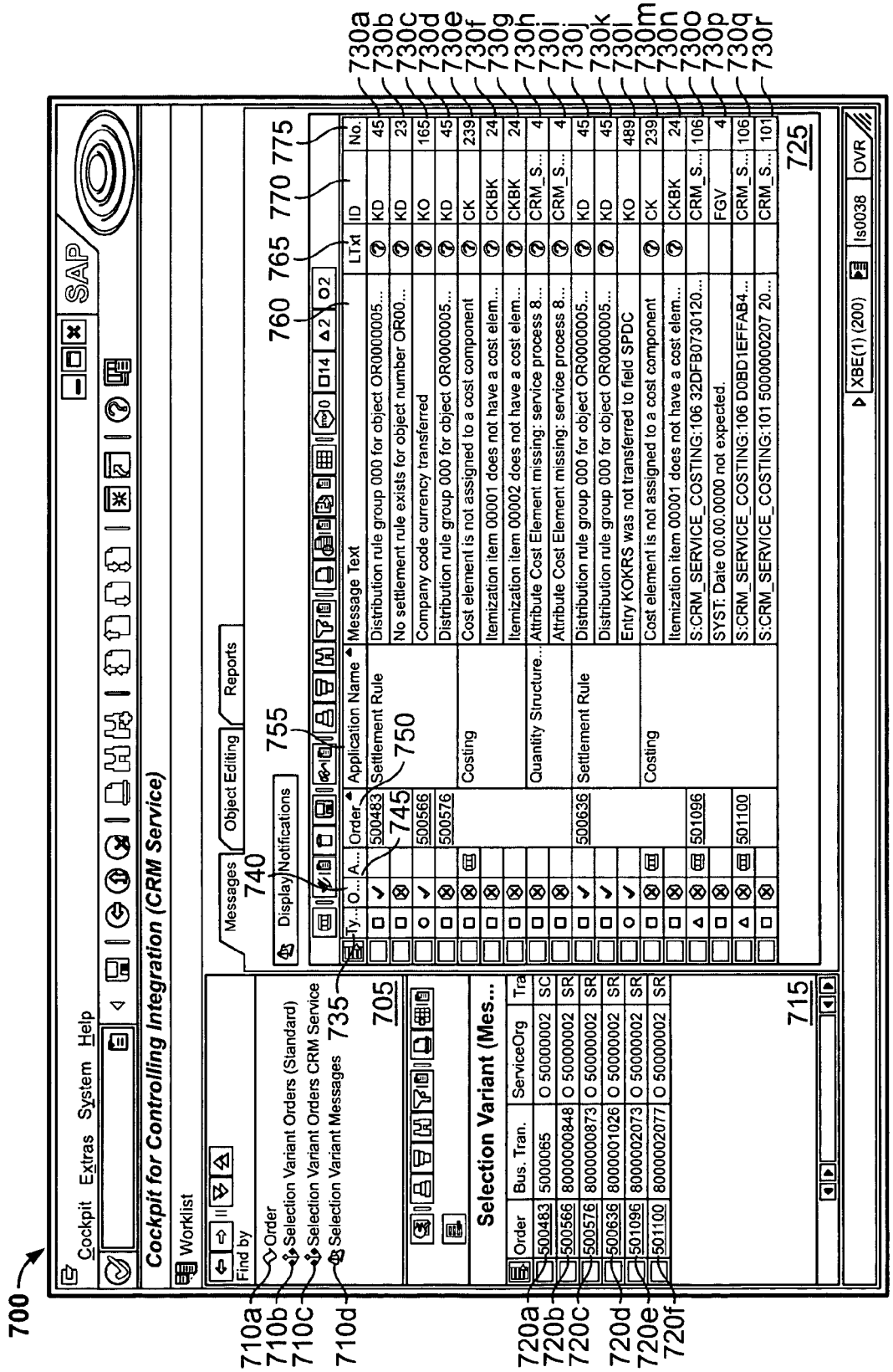
Figure 8:
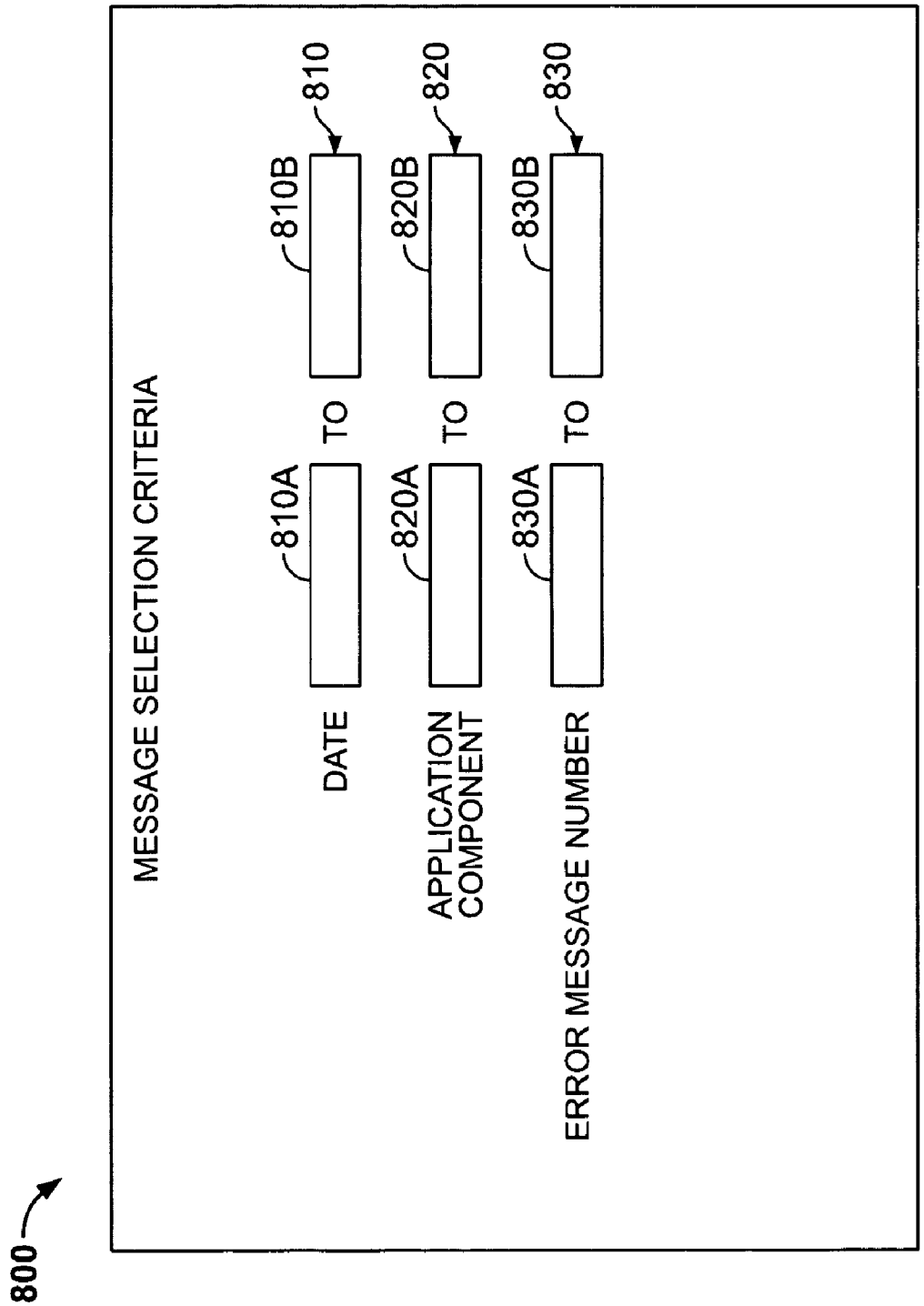

FIGS. 7 and 8 illustrate an implementation of handling errors related to controlling objects in a financial application. A controlling object is a type of data used in some financial applications to identify costs and revenue information. A controlling object may be used to calculate profitability related to an entity represented by a particular controlling object. The displays illustrated in FIGS. 7 and 8 may be part of the error handling user interface 160 included in the financial application 140 in FIG. 1 or the error handling user interface 260 included in the financial application 240 in FIG. 2.

FIG. 7 is an illustration of an error handling display 700 operable to enable a user to handle errors that occur on a financial application when processing data received from another application. The error handling display 700 includes a method display 705 that identifies various methods by which a user is able to identify controlling objects to be displayed in a worklist 715 of controlling objects. As illustrated, the method display 705 includes methods 710*a*-710*c* by which controlling objects are displayed based on an attribute of a controlling object. By contrast, the method 710*d* illustrates a method to select controlling objects to be displayed in the worklist 715 of controlling objects based on the type of error message associated with the controlling object.

Referring also to FIG. 8, an error message selection criteria display 800 is shown by which a user identifies controlling objects to be displayed in the detailed worklist 725 based on type of error messages associated with the controlling objects. Using the error message selection criteria display 800, a user identifies a criterion or criteria for identifying the error messages to display. The user may identify the error messages based on one or more of the date 810 on which the error message was generated, the application component 820 that generated the error message, and the error message number 830 of the error message. As illustrated, the date 820 may be a particular date (in which case only a date is specified in the first date entry 810A) or a range of dates (in which the date range boundaries are entered in the first date entry 810A and the second date entry 810B). Similarly, application components 820 may be specified by identifying an application component in the financial system in the first application component entry 820A and, optionally, another application component in the second application component entry 820B. When application components are identified in both the first application component entry 820A and the second application component entry 820B, error messages are selected for all application components that are within the alphabetical range identified by the application component names in entries 820A and 820B. In some implementations, the first application component entry 820A and the second application component entry 820B may define a range of application components for which error messages are to be displayed. The ability to define a range of application components may be particularly useful when a financial application includes multiple application components that are sequentially involved in processing received data. Also, the error message numbers of the error messages may be specified by identifying a particular error message number in the first message number entry 810A or a range of error message numbers by entering the desired range boundaries in the first error message number entry 830A and the second error message number entry 830B.

Referring again to FIG. 7, the error handling user display 700 includes a detailed error list 725 having multiple headings 735-775, and each of the headings 735-775 corresponds to a particular type of information that describes the errors 730*a*-730*r*. The list of errors 730*a*-730*r* may be sorted according to a type of information indicated by the headings 735-775 by selecting the appropriate heading 735-775. The detailed worklist 725 provides additional information about the controlling objects identified and displayed in the worklist 715. In some implementations, the detailed worklist 725 may be presented for only some of the controlling objects identified and displayed in the worklist 715. In such a case, the user may select the controlling objects from worklist 715 for which additional information is displayed in the detailed worklist 725.

The detailed worklist 725 includes an urgency heading 735 under which the urgency of each of the errors 730*a*-730*r* is listed. In one implementation, the urgency may be indicated with color-coded indicators (here, red, yellow, and green boxes). A red box indicates that the corresponding error is of high urgency and should be addressed immediately. A yellow box indicates that the corresponding error is of medium urgency and should be corrected soon but not necessarily immediately. A green box indicates that the corresponding error is of low urgency and may be corrected later.

The detailed worklist 725 also includes a status heading 740 under which the status of the correction of the errors 730a-730r is indicated. The indication of status may include an indication that the error has been corrected (here, shown as a graphical icon of a checkmark), as well as an indication that the error has not been corrected (here, some as a graphical icon as an "X" within a circle).

The detailed worklist 725 also includes an automatic processing heading 745 under which an indication of whether the error 730a-730r are able to be re-processed is displayed. In shown implementation, the presence of an icon under the automatic processing heading 745 in an entry in the detailed worklist 725 indicates that the corresponding error is associated with error correction guidance, while the absence of an icon indicates that the corresponding error is to be manually corrected without benefit of error correction guidance. By activating (such as by pressing) the icon, the user may initiate the presentation of the error correction guidance for the corresponding error.

The detailed worklist 725 includes an order heading 750 under which the sales order object applicable to each of the errors 730a-730r is identified. The detailed worklist 725 also includes an application name heading 755 under which the name of the application component of the financial applications in which each of the errors 730a-730r occurred is listed.

Text describing the errors 730a-730r is listed under a message text heading 760 in the detailed worklist 725. Links to further text describing the errors 730a-730r, if available, are presented below a linked text heading 760. In one implementation, a selectable icon is presented in an entry for one of the errors 730a-730r when additional text describing the corresponding error is available, and selecting the icon displays the additional text. If no icon is displayed for one of the errors 730a-730r, then no additional text is available for the corresponding error.

The detailed worklist 725 includes an identifier heading 770 and an error number heading 775 that may be used together to identify each of the errors 730a-730r.

The displays in FIGS. 6-8 may be implemented as windows, panes, or a combination of windows and panes. In general, a window is a display over which a user may control the display position of each window on a display device. A user's control over the display position of a window may include, for example, indirect or direct control of the coordinates of the display device at which the window is positioned, the size of the window, and the shape of the window. In contrast, a pane is a portion of a graphical user interface in which the pane is displayed in a fixed position on a display device.

The techniques described herein refer to the detection and handling of errors that stop the processing of data. As would be recognized by one skilled in the art, the techniques also may be applicable to errors in which a problem with the received or processed data is determined even when the problem does not necessarily stop the processing of data or prevent the storage of all, or some portion, of the received or process data in the financial data used by the financial application. In some implementations, the term "error" is only used to refer to a problem that interrupts the processing, whereas the term "warning" is used to refer to a problem that occurs during, but does not interrupt, the processing of data. Using that terminology, these techniques may be used to store both error messages and warning messages in the error message store and use the described error handling interface to correct problems associated with the stored error messages and warning messages.

A sales system and a financial system are used in the description of the technology as examples of computer applications that are components of an enterprise IT system between which data is sent to perform an integrated computing process. As would be understood by one skilled in the art, many different types of computer applications of an enterprise IT system may be used to generate and send data to a receiving computer application for processing. For example, the enterprise IT system may include a logistics application, an order management application, or a manufacturing control application that generates and sends data to the financial application for processing. Furthermore, the enterprise IT system may include more than two applications that send data to the financial application.

A middleware messaging system is included throughout as a means for transferring data and error messages throughout the enterprise IT system. However, other means of electronically transferring the data and error messages throughout the enterprise IT system may be used. For example, the data may be transferred using e-mail messages, hypertext transfer protocol (HTTP), or file transfer protocol (FTP).

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM (erasable programmable read-only memory), EEPROM (electrically erasable programmable read-only memory), and flash memory devices; magnetic disks, e.g., internal hard disks or removable disks; magneto-optical disks; and CD-ROM (compact disk read-only memory) and DVD-ROM (digital versatile disk read-only memory) disks. The processor and the memory can be supplemented by, or incorporated in special purpose logic circuitry.

Nevertheless, it will be understood that various modifications may be made without departing from the spirit and scope of the invention. Accordingly, other implementations are within the scope of the following claims.

What is claimed is:

1. A computer program product tangibly embodied on a machine-readable storage device, the computer program product including instructions that, when executed, cause an error handling component to perform operations comprising:
   receiving an indication of an error related to processing application transaction data received by a first computer application and sent from, and generated by, a second computer application, as part of an integrated computing process, wherein:
      the application transaction data is processed by the second computer application and sent to the first computer application for further processing, and
      the error is detected by the first computer application during the processing of the received application transaction data and is of a nature that the processing of the received application transaction data by the first computer application is halted because of the error;
   determining a type of error associated with the error;
   based on the determined type of error, displaying error correction guidance to a user of the first computer application for use in using the first computer application to correct the error, wherein the error correction guidance includes:
      a display of information about incomplete or missing data related to a particular transaction in the application transaction data received from the second computer application that is related to the error, and
      a control operable for receiving entry of the incomplete or missing data;
   in response to receiving an indication that the error has been corrected by the user of the first computer application, initiating processing by the first computer application of the application transaction data received by the first computer application; and
   sending the error to the second computer application for correction when the error is not correctable by the first computer application.

2. The computer program product of claim 1 wherein processing steps successfully performed before detection of the error are not repeated in the processing by the first computer application of the application transaction data that is performed after the receipt of the indication that the error has been corrected.

3. The computer program product of claim 1 wherein the error correction guidance further comprises:
   a display of information describing the error related to a particular transaction in the application transaction data received from the second computer;
   a particular transaction in the application transaction data received from the second computer application that is related to the error; and
   a control operable to initiate a function in the first computer application that may be used to correct the error.

4. The computer program product of claim 1 wherein the error correction guidance further comprises a user interface for performing a sequence of multiple steps in an error correction process wherein the user interface includes, for each step, 1) a display of directions for performing the step, 2) a control for progressing to a next step in the sequence of multiple steps, and 3) a control operable for receiving entry of data related to the step.

5. The computer program product of claim 1 further configured to:
   enable a user to associate a type of error with particular error correction guidance to be used to correct the type of error;
   determine a type of error that is associated with the error; and
   based on 1) a determination as to the type of error that is associated with the error and 2) an association of the type of error and particular error correction guidance, display the particular error correction guidance.

6. The computer program product of claim 1 wherein the error is a first error and the computer program product of claim 1 is further configured to:
   receive an indication of a second error related to processing application transaction data received by a first computer application and sent from, and generated by, a second computer application, as part of an integrated computing process wherein the second error is associated with a second application transaction received from the second computer application and is of the same type of error that is associated with the first error; and
   in response to receiving an indication that the first error has been corrected by the user, initiating processing by the first computer application of the second application transaction data received by a first computer application.

7. The computer program product of claim 1 wherein the first computing application comprises a financial application and the second computing application comprises a logistics application.

8. The computer program product of claim 1 wherein the first computing application operates on a first computing system, the second computing application operates on a second computing system, and the application transaction data is communicated between the first computing system and the second computing system.

9. The computer program product of claim 1 wherein a user of the second computer application is unable to use the first computer application to correct the error detected by the first computer application.

10. The computer program product of claim 1 wherein the application transaction data comprises data related to sales transactions.

11. A method for error handling, the method comprising:
   receiving an indication of an error related to processing application transaction data received by a first computer application and sent from, and generated by, a second computer application, as part of an integrated computing process, wherein:
      the application transaction data is processed by the second computer application and sent to the first computer application for further processing, and
      the error is detected by the first computer application during the processing of the received application transaction data and is of a nature that the processing of the received application transaction data by the first computer application is halted because of the error;

determining a type of error associated with the error;

based on the determined type of error, displaying error correction guidance to a user of the first computer application for use in using the first computer application to correct the error, wherein the error correction guidance includes:
- a display of information about incomplete or missing data related to a particular transaction in the application transaction data received from the second computer application that is related to the error, and
- a control operable for receiving entry of the incomplete or missing data;

in response to receiving an indication that the error has been corrected by the user of the first computer application, initiating processing by the first computer application of the application transaction data received by a first computer application; and sending the error to the second computer application for correction when the error is not correctable by the first computer application.

12. The method of claim 11 wherein processing steps successfully performed before detection of the error are not repeated in the processing by the first computer application of the application transaction data that is performed after the receipt of the indication that the error has been corrected.

13. The method of claim 11 wherein the error correction guidance further comprises:
- a display of information describing the error related to a particular transaction in the application transaction data received from the second computer;
- a particular transaction in the application transaction data received from the second computer application that is related to the error; and
- a control operable to initiate a function in the first computer application that may be used to correct the error.

14. The method of claim 11 wherein the error correction guidance further comprises a user interface for performing a sequence of multiple steps in an error correction process wherein the user interface includes, for each step, 1) a display of directions for performing the step, 2) a control for progressing to a next step in the sequence of multiple steps, and 3) a control operable for receiving entry of data related to the step.

15. A system for error handling, the system comprising:
- a processor configured to receive instructions and data from a storage device, wherein the processor is configured to:
  receive an indication of an error related to processing application transaction data received by a first computer application and sent from, and generated by, a second computer application, as part of an integrated computing process, wherein:
  the application transaction data is processed by the second computer application and sent to the first computer application for further processing, and
  the error is detected by the first computer application during the processing of the received application transaction data and is of a nature that the processing of the received application transaction data by the first computer application is halted because of the error;

determine a type of error associated with the error;

based on the determined type of error, display error correction guidance to a user of the first computer application for use in using the first computer application to correct the error, wherein the error correction guidance includes:
  - a display of information about incomplete or missing data related to a particular transaction in the application transaction data received from the second computer application that is related to the error, and
  - a control operable for receiving entry of the incomplete or missing data;

in response to receiving an indication that the error has been corrected by the user of the second computer application, initiate processing by the first computer application of the application transaction data received by a first computer application; and send the error to the second computer application for correction when the error is not correctable by the first computer application.

16. The system of claim 15 wherein processing steps successfully performed before detection of the error are not repeated in the processing by the first computer application of the application transaction data that is performed after the receipt of the indication that the error has been corrected.

17. The system of claim 15 wherein the error correction guidance further comprises:
- a display of information describing the error related to a particular transaction in the application transaction data received from the second computer;
- a particular transaction in the application transaction data received from the second computer application that is related to the error; and
- a control operable to initiate a function in the first computer application that may be used to correct the error.

18. The system of claim 15 wherein the error correction guidance further comprises a user interface for performing a sequence of multiple steps in an error correction process wherein the user interface includes, for each step, 1) a display of directions for performing the step, 2) a control for progressing to a next step in the sequence of multiple steps, and 3) a control operable for receiving entry of data related to the step.

* * * * *